(12) United States Patent
Mahlberg et al.

(10) Patent No.: US 8,376,653 B2
(45) Date of Patent: Feb. 19, 2013

(54) SELF-PROPELLED ROAD CONSTRUCTION MACHINE

(75) Inventors: Axel Mahlberg, Hennef (DE); Lothar Schwalbach, Scheuring (DE); Günter Hähn, Königswinter (DE)

(73) Assignee: Wirtgen GmbH (DE)

( * ) Notice: Subject to any disclaimer, the term of this patent is extended or adjusted under 35 U.S.C. 154(b) by 109 days.

(21) Appl. No.: 12/596,051

(22) PCT Filed: Apr. 23, 2007

(86) PCT No.: PCT/EP2007/053647
§ 371 (c)(1),
(2), (4) Date: Sep. 10, 2010

(87) PCT Pub. No.: WO2008/128562
PCT Pub. Date: Oct. 30, 2008

(65) Prior Publication Data
US 2010/0329784 A1 Dec. 30, 2010

(51) Int. Cl.
*E01C 19/05* (2006.01)
(52) U.S. Cl. ............................................. 404/83; 404/94
(58) Field of Classification Search .................. 404/83, 404/87, 94, 96, 117, 133.2
See application file for complete search history.

(56) References Cited

U.S. PATENT DOCUMENTS

| | | | | |
|---|---|---|---|---|
| 3,861,749 A | * | 1/1975 | Georg | 299/32 |
| 4,717,205 A | * | 1/1988 | Sasage | 299/39.3 |
| 4,744,604 A | * | 5/1988 | Lewis et al. | 299/10 |
| 4,791,829 A | * | 12/1988 | Fukushima et al. | 74/574.3 |
| 5,354,147 A | * | 10/1994 | Swisher, Jr. | 299/39.6 |
| 6,634,477 B2 | | 10/2003 | Beneton et al. | |
| 7,644,994 B2 | * | 1/2010 | Busley et al. | 299/39.4 |

FOREIGN PATENT DOCUMENTS

| | | | |
|---|---|---|---|
| CN | 1364985 A | | 8/2002 |
| DE | 3609048 A1 | | 10/1986 |
| EP | 1760358 A1 | | 3/2007 |
| FR | 2855226 A1 | | 11/2004 |
| RU | EP1911993 | * | 1/2005 |
| WO | 0201005 A1 | | 1/2002 |

OTHER PUBLICATIONS

Exhibit A: International Search Report from corresponding application PCT/EP2007/053647.

* cited by examiner

*Primary Examiner* — Raymond W Addie
(74) *Attorney, Agent, or Firm* — Waddey & Patterson, P.C.; Lucian Wayne Beavers

(57) ABSTRACT

In an automotive road construction machine (1), with a working drum (6) for working a ground surface or traffic surface (3) mounted at a machine frame (4), a combustion engine (10) for driving the working drum (6), and a drive train (8) between the combustion engine (10) and the working drum (6), it is provided that at least one vibration damper (5) and/or vibration absorber is arranged at the working drum (6) or in the drive train (8) downstream of the combustion engine (10), with the said vibration damper (5) and/or vibration absorber eliminating or reducing rotary vibrations generated by the combustion engine (10).

15 Claims, 5 Drawing Sheets

SELF-PROPELLED ROAD CONSTRUCTION MACHINE

Figure 1:
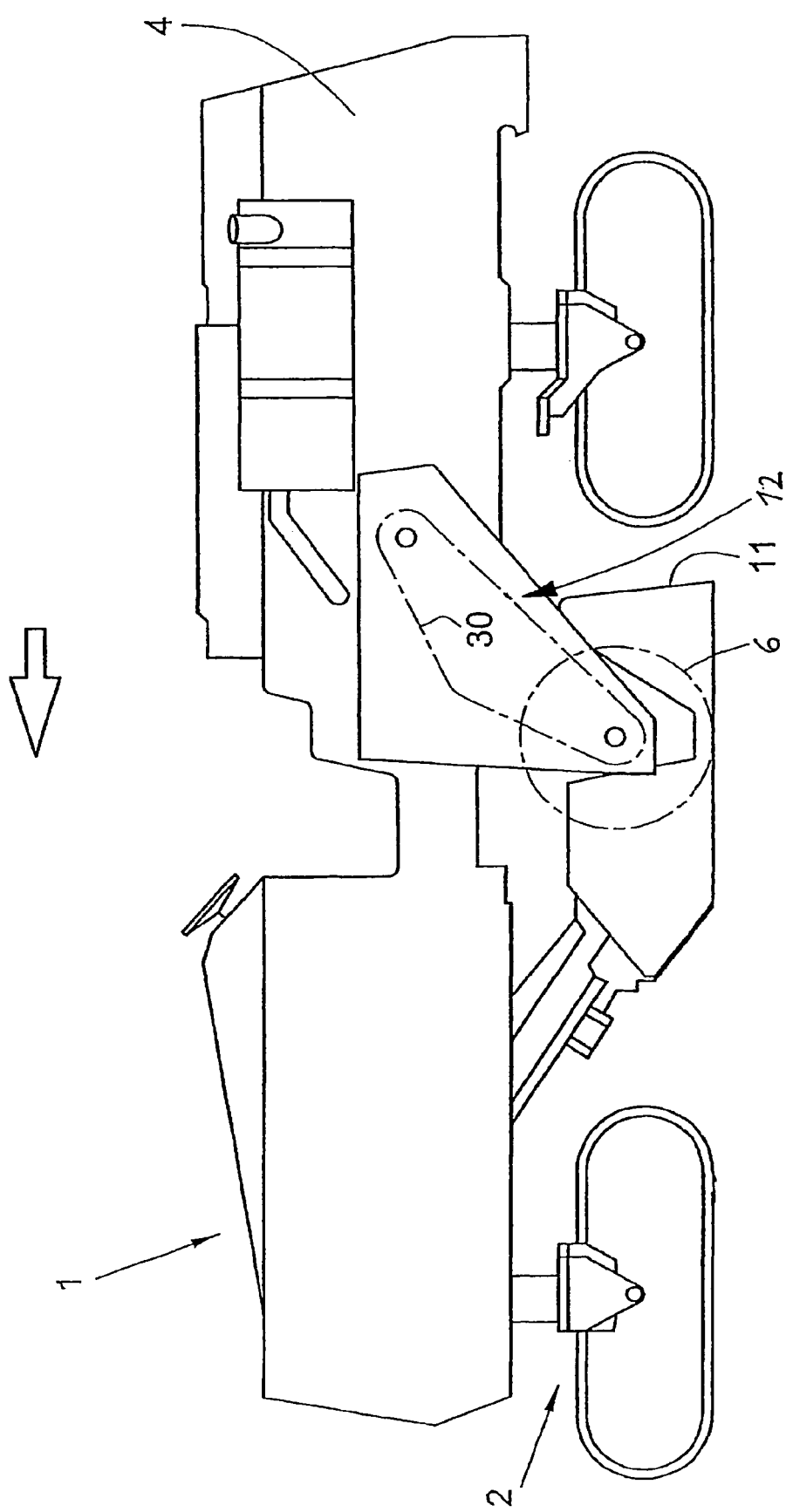

The invention relates to an automotive road construction machine, in particular a road milling machine, a stabilizer, or a recycler, as well as a vibration damper for a road construction machine, and a clutch.

Such road construction machines are known, for instance, from WO02/01005. The combustion engines of the newer generation, in particular diesel engines, used in such road construction machines generate rotary vibrations of significant proportions due to the lightweight design. This results partly from the fact that light components, in particular light crankshafts and flywheels, are increasingly used, and from the fact that the combustion process happens differently as a result of altered ignition times and injection times due to exhaust emission stipulations, which leads to the generation of unwanted rotary vibrations on the output side.

The significant extent of rotary vibrations creates problems, however, with downstream drive mechanisms in the drive train like, for instance, with down stream clutches and gearboxes. Material fatigue, as well as wear and tear can increase considerably, which can lead to a reduced service life of the elements in the drive train.

It is an objective of the present invention to create an automotive road construction machine, a vibration damper, or a clutch with a vibration damper respectively, in which unwanted rotary vibrations in the drive train are damped in an advantageous manner.

The invention serves to provide a solution to this objective.

The invention provides in an advantageous manner that at least one vibration damper and/or vibration absorber is arranged at the working drum or in the drive train downstream of the combustion engine, with the said vibration damper and/or vibration absorber eliminating or reducing rotary vibration generated by the combustion engine.

The invention permits in an advantageous manner to damp or eliminate the rotary vibrations originating from the combustion engine, and other rotary vibrations in the drive train or at the working drum.

The drive train comprises, for example,
a clutch for switching the power flow,
a traction mechanism with drive elements and output elements,
a planetary gear for the working drum, and/or
an elastic coupling, and/or
a pump transfer case.

It may be provided that the at least one vibration damper and/or vibration absorber is arranged at the elastic coupling between the combustion engine and the pump transfer case.

Alternatively, the at least one vibration damper and/or vibration absorber may be arranged at the pump transfer case itself.

According to a further alternative, the at least one vibration damper and/or vibration absorber may be arranged at the clutch between the pump transfer case and a belt pulley of the traction mechanism.

At the clutch, the at least one vibration damper and/or vibration absorber is preferably arranged on the output side.

According to a further alternative, the at least one vibration damper and/or vibration absorber is arranged at a belt pulley of the traction mechanism.

Alternatively, the one vibration damper and/or vibration absorber may further be arranged at the planetary gear for the working drum.

Finally, the at least one vibration damper and/or vibration absorber may also be arranged on the inside of the working drum coaxially to the axis of the working drum.

It is understood that vibration dampers and/or vibration absorbers may also be arranged in the drive train at several of the places mentioned before.

The vibration damper and/or vibration absorber consists preferably of an elastomer-metal composite element. The vibration damper and/or vibration absorber may consist of an additional mass or vibrating mass arranged coaxially to that particular shaft in which the rotary vibrations of the combustion engine are occurring, where the said additional mass or vibrating mass is capable of being excited to rotary vibrations that counteract the rotary vibrations of the combustion engine because of inertia.

The vibration damper and/or vibration absorber may consist of a connecting device for connection to a rotating element of the drive train, which is coupled to at least one flywheel mass via an elastic element. The same may be arranged symmetrically and coaxially to the rotating element.

A preferred embodiment provides that the vibration damper and/or vibration absorber consists of a first inner ring with a connecting device, as well as a flywheel mass arranged annularly coaxially to the first ring, the said flywheel mass being coupled to the first ring via an elastic element. The flywheel mass may consist of a second ring that is concentric or coaxial to the first ring, with at least one elastic element being provided between the first ring and the second ring.

The elastic element consists preferably of an elastomer or of metallic springs like, for instance, disc springs, leaf springs, or coil springs.

The elastic element is preferably arranged annularly, and may consist of an elastic ring.

The elastic element may show a rigidity of 1000 Nm/rad to 500000 Nm/rad, preferably between 30000 Nm/rad and 50000 Nm/rad.

The elastic element of a vibration damper and/or vibration absorber at a clutch preferably shows a rigidity of 35000 Nm/rad to 45000 Nm/rad, for instance, 40000 Nm/rad.

Furthermore, the elastic element has a damping value in the range between 0.05 to 0.5.

The elastic element of a vibration damper and/or vibration absorber at a clutch preferably shows a damping value of 0.15 to 0.2, for instance, 0.175.

The solution to the objective further consists of a vibration damper for a road construction machine, in particular for a drive train of a road construction machine, comprising a first ring with a connecting device for a clutch or another element of the drive train, as well as a second ring, with the second ring surrounding the first ring at least sectionally, and with at least one elastic element being provided between the first ring and the second ring.

Because the vibration damper comprises a first ring with a connecting device for a clutch, as well as a second ring, where the second ring surrounds the first ring at least sectionally, and with at least one elastic element being provided between the first ring and the second ring, the desired damping effect develops essentially through the inertia of the mass of the second ring and through the elastic properties of the material between the rings.

The second ring preferably acts as a flywheel mass and does not show connecting elements for, for instance, an output.

As a compactly built unit, a clutch with vibration damper described earlier offers advantageous properties for damping rotary vibrations, and can in particular be installed without difficulty into an existing drive train in lieu of a conventional clutch.

Figure 2:
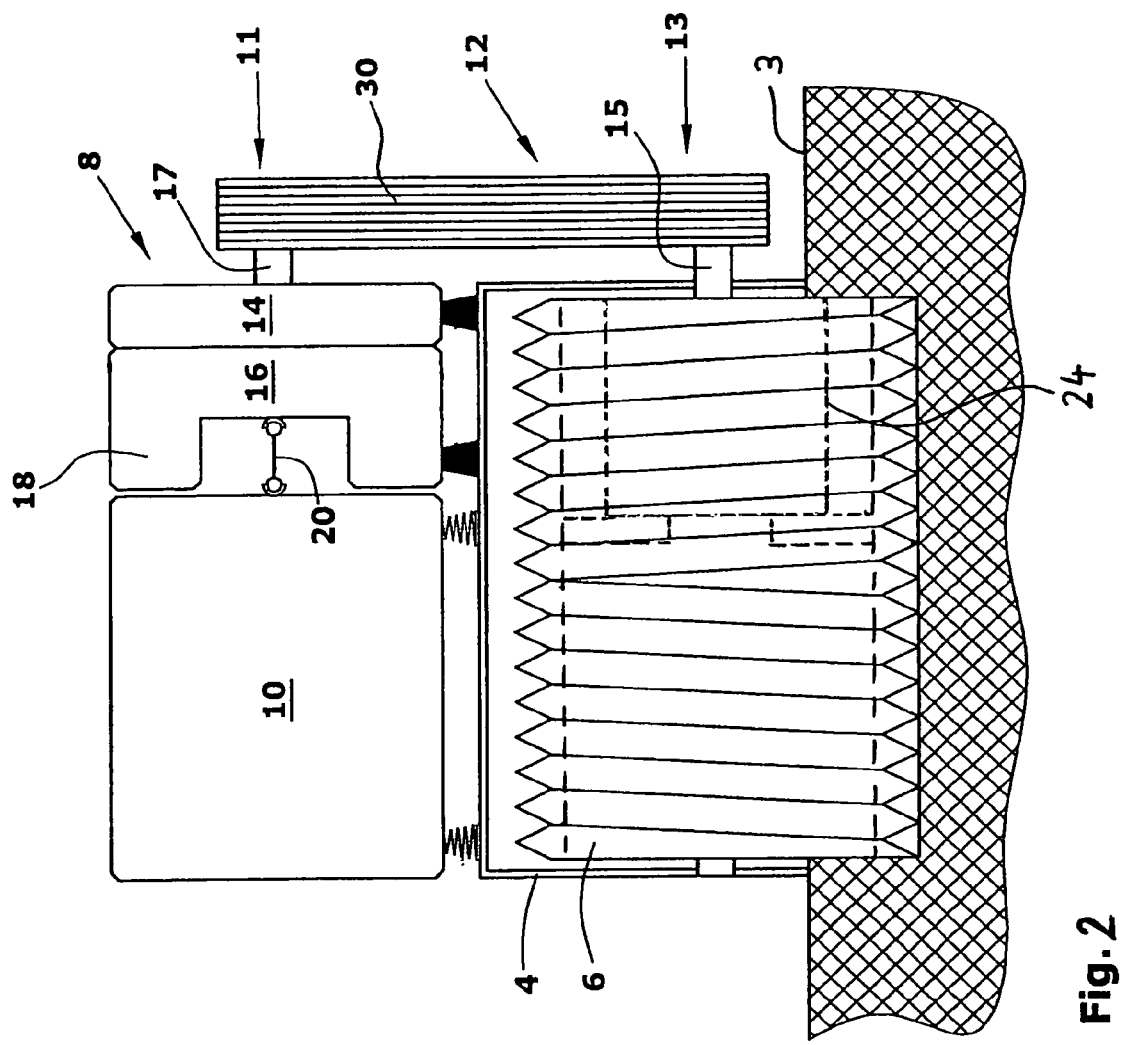
Figure 3:
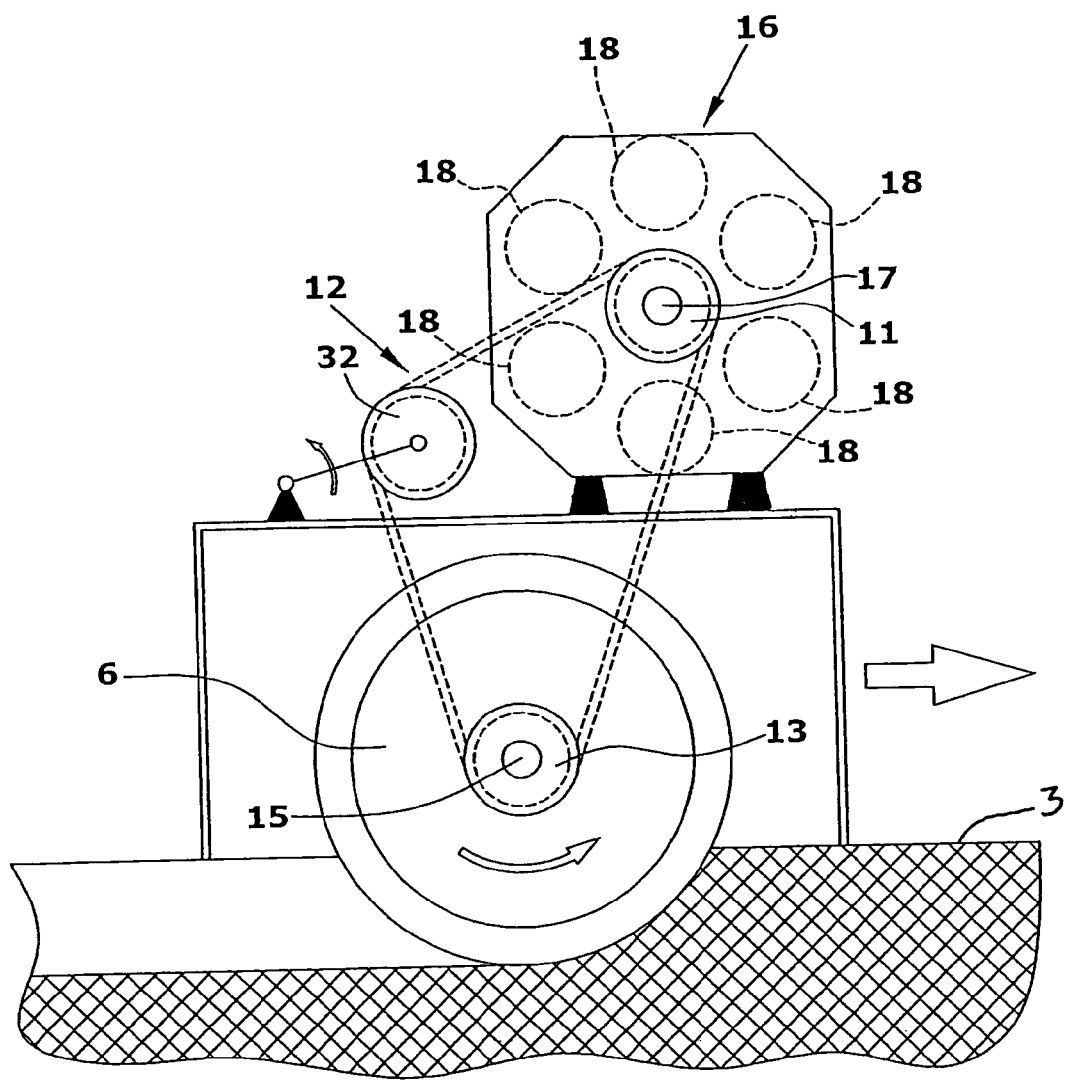
Figure 4:
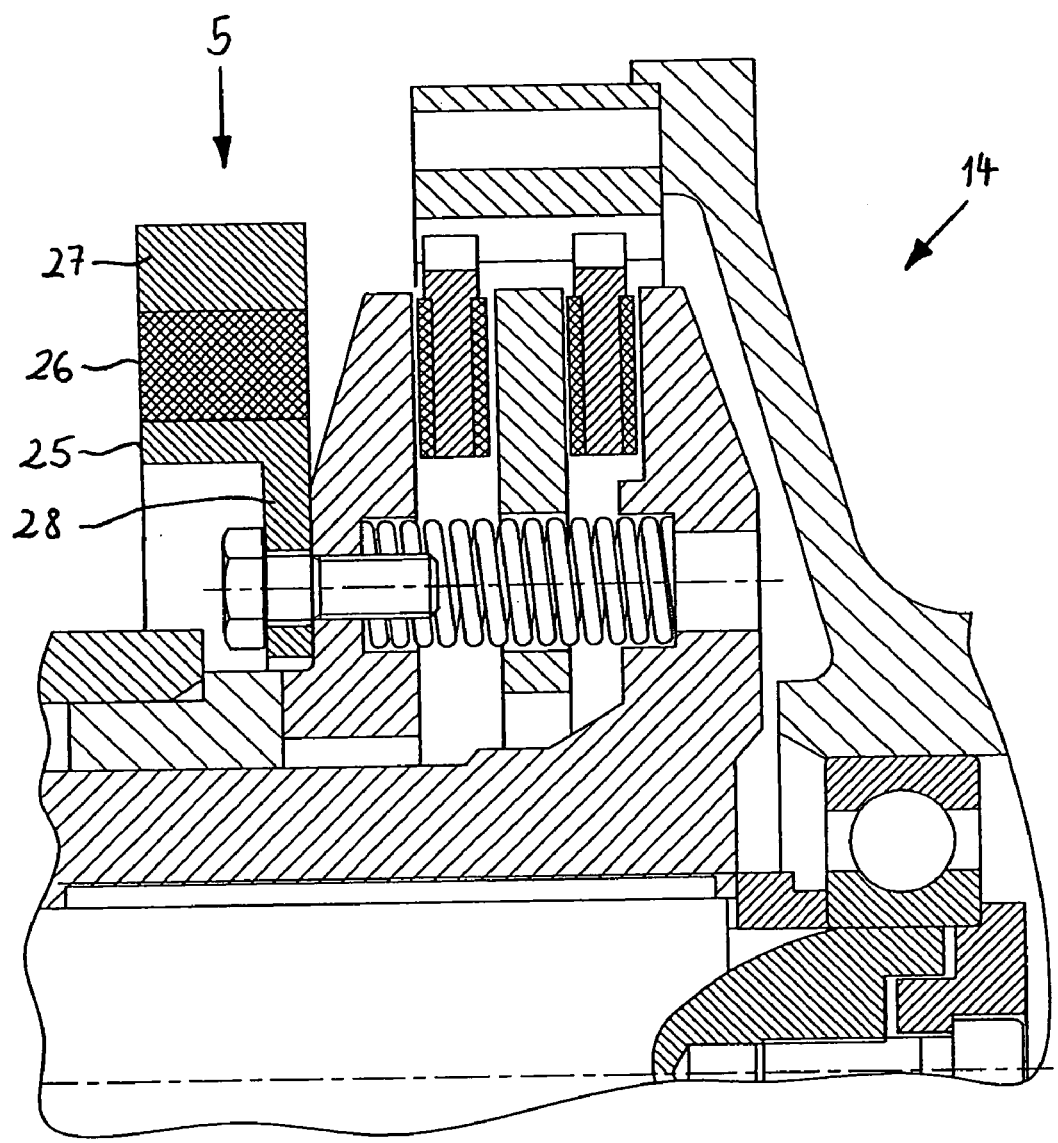

In the following, an embodiment of the invention is explained in more detail with reference to the drawings:

The following is shown:

FIG. 1 a road construction machine,

FIG. 2 a schematic depiction of a drive train in the road construction machine,

FIG. 3 a schematic side view of the drive train,

FIG. 4 a clutch with vibration damper provided on the output side, and

Figure 5:
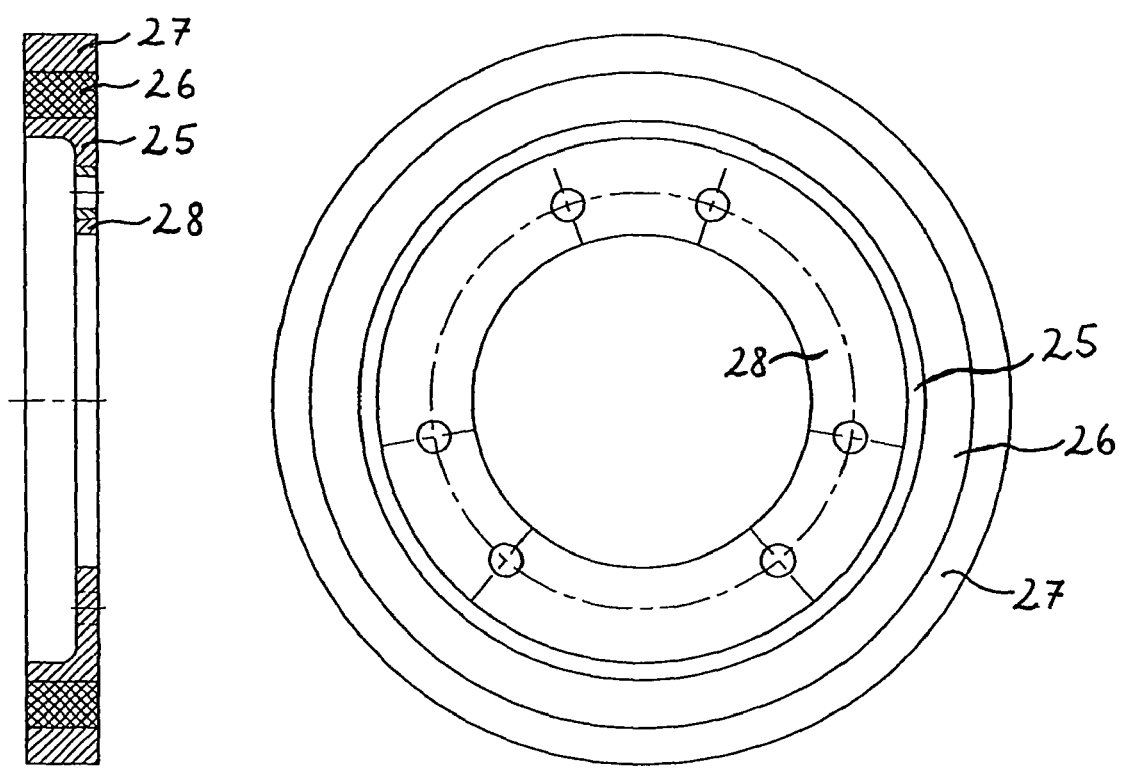

FIG. 5 the vibration damper of the clutch according to FIG. 4.

FIG. 1 shows a construction machine 1 in the form of a large milling machine with a machine frame 4 carried by a height-adjustable chassis 2. A working drum 6 with tools consisting of milling bits for working a pavement surface is mounted at the machine frame 4. The working drum 6 is driven by a drive train 8. The drive train 8 comprises at least a drive engine 10, as well as a traction mechanism 12 coupled to the drive engine 10. The traction mechanism 12 preferably consists of a belt drive with one belt pulley 11 on the engine side, and one belt pulley 13 on the drum side, which are coupled to each other with at least one drive belt 30. The drive belts 30 are preferably composed of V-belts.

FIG. 2 shows a schematic cross-section of a construction machine, and namely in particular a road milling machine, a recycler or a stabilizer with a working drum 6 that is mounted in a machine frame 4. Alternatively, the working drum 6 may be mounted in a drum housing that is in turn firmly attached to the machine frame. The working drum 6 may also be mounted to pivot at a machine frame 4. The machine frame 4 is carried by a chassis 2, which is depicted in FIG. 1. The working drum 6 may consist of, for instance, a milling drum 6. The working drum 6 of the construction machine is driven by a drive train 8 which is provided with at least the following elements:

The drive train 8 includes a drive engine 10 which consists preferably of a diesel engine. The combustion engine is coupled to a pump transfer case 16 via an elastomer coupling 20. The elastomer coupling 20 may also be arranged at a different place within the drive train 8.

A traction mechanism 12 for the mechanical drive of the working drum 6 is provided with a drive element 11 which is coupled to an output shaft 17 in a non-rotatable manner, and an output element 13 which is coupled to the drive shaft 15 of the working drum 6 in a non-rotatable manner. A planetary gear 24 may additionally be arranged between the drive shaft 15 and the working drum 6.

The traction mechanism 12 is preferably a belt drive, where the drive and output elements consist of belt pulleys 11, 13, with several drive belts 30 revolving around the said belt pulleys 11, 13. Alternatively, the traction mechanism 12 may also consist of a chain drive, with the drive and output elements then consisting of sprockets.

The drive train 8 is further provided with a conventional device for switching the torque, which is arranged in the drive train 8 between the drive engine 10 and the working drum 6, and preferably consists of a clutch 14 of, for instance the Planox type.

The drive train 8 further includes a device 16, which is coupled to the drive engine 10, for driving hydraulic modules, for instance, hydraulic pumps 18.

FIG. 2 shows the drive train 8 consisting of the drive engine 10, which may be coupled to a pump transfer case 16, at which different hydraulic pumps 18 may be connected for different functions of the construction machine 1.

The drive engine 10 or the pump transfer case 16 respectively may be coupled to the belt pulley 11 on the engine side via a clutch 14. The working drum 6 is mounted at the machine frame 4. A reduction gear, for instance, a planetary gear 24, may be arranged in the working drum 6, which decreases the speed of the belt pulley 13 on the drum side in a ratio of, for instance, 1:20. The working drum 6 can thus work at a working speed of approximately 100 rpm when the drive engine 10 is operated at a speed of, for instance, 2000 rpm, and the traction mechanism 12 has a gear ratio of 1:1.

As can be seen from FIG. 3, the pump transfer case 16 shows, for instance, six hydraulic pumps 18 that are arranged in a circular manner and with, for instance, the same mutual distance to one another around the output shaft 17 of the drive train 8. A tensioning idler 32 for the traction mechanism 12 is depicted in FIG. 3.

FIG. 4 shows a conventional, preferably hydraulically operated clutch 14, with a vibration damper 5 coupled to it on the output side, which is depicted in FIG. 5 fully in a cross-sectional view and in a top view.

The vibration damper 5 consists of several concentric rings, with a first inner ring 25 being provided with a connecting device 28, for instance, a connecting flange. The first ring 25 is surrounded by an elastic element 26 which, in the embodiment, entirely surrounds the first ring peripherally.

The second ring 27, which runs concentrically and coaxially to the first ring 25, serves as flywheel mass and is in turn firmly attached to the elastic element 26 peripherally.

FIG. 5 shows a radial arrangement of the first inner ring 25, the elastic element 26, and the outer second ring 27. It is understood, however, that an axial arrangement of these rings 25, 26, 27 is also possible. Furthermore, the flywheel mass does not necessarily have to be of annular shape, but may also consist of several individual flywheel masses arranged symmetrically around the power-transmitting shaft. Furthermore, the first ring 25 may at the same time form the connecting device 28. Finally, a connecting device 28 not necessarily of annular shape may be provided in lieu of the first ring 25, which serves the purpose of coupling to a power-transmitting shaft and is connected in a non-rotatable manner to the elastic element 26. At least one flywheel mass is then attached to the elastic element in a non-rotatable manner and at a radial distance towards the outside.

The elastic element 26 may consist of an elastomer or else of metallic springs, for instance, disc springs, leaf springs, or coil springs, which act in the direction of the rotary vibrations.

When using the elastic element 26 in a clutch 14, a rigidity of 35000 Nm/rad to 45000 Nm/rad is preferred, with a value of 40000 Nm/rad having proved to be particularly suitable. The relative damping value then is between 0.15 and 0.2, preferably 0.175.

Because of the inertia of the vibration damper 5, the flywheel mass of the vibration damper 5 acts against the rotary vibrations of the combustion engine 10, damping or eliminating the same.

The invention claimed is:

1. An automotive road construction machine, comprising;
   a working drum mounted at a machine frame for working a ground surface or traffic surface;
   a combustion engine for driving the working drum;
   a drive train between the combustion engine and the working drum, the drive train including a clutch having an input side and an output side;

at least one vibration damper and/or vibration absorber coupled to the output side of the clutch, the at least one vibration damper and/or vibration absorber including;
a connecting device connected to the output side of the clutch;
a flywheel mass; and
an elastic element connecting the flywheel mass to the connecting device; and
wherein the said vibration damper and/or vibration absorber eliminates or reduces rotary vibrations generated by the combustion engine.

2. Road construction machine in accordance with claim 1, wherein the vibration damper and/or vibration absorber comprises an elastomer-metal composite element.

3. Road construction machine in accordance with claim 1, wherein the elastic element comprises an elastomer or metallic springs.

4. Road construction machine in accordance with claim 1, wherein the elastic element comprises an elastic ring.

5. Road construction machine in accordance with claim 1, wherein the elastic element has a rigidity of 1000 Nm/rad to 500000 Nm/rad.

6. Road construction machine in accordance with claim 1, wherein the elastic element of the vibration damper and/or vibration absorber has a rigidity of 35000 Nm/rad to 45000 Nm/rad.

7. Road construction machine in accordance with claim 1, wherein the elastic element has a relative damping value of 0.05 to 0.5.

8. Road construction machine in accordance with claim 1, wherein the elastic element of the vibration damper and/or vibration absorber is located at the clutch and has a relative damping value of 0.15 to 0.2.

9. An automotive road construction machine, comprising:
a machine frame;
a working drum supported from the machine frame for working a ground surface or traffic surface;
a combustion engine for driving the working drum;
a drive train between the combustion engine and the working drum, the drive train including a clutch having an input side and an output side; and
at least one vibration damper and/or vibration absorber coupled to the output side of the clutch, the at least one vibration damper and/or vibration absorber including an additional mass arranged coaxially to an axis of rotary vibration in which the rotary vibrations of the combustion engine are occurring, and radially towards the outside, with the said additional mass capable of being excited to rotary vibrations which counteract the rotary vibrations of the combustion engine, wherein the said vibration damper and/or vibration absorber eliminates or reduces rotary vibrations generated by the combustion engine.

10. An automotive road construction machine, comprising:
a machine frame;
a working drum supported from the machine frame for working a ground surface or traffic surface;
a combustion engine for driving the working drum;
a drive train between the combustion engine and the working drum, the drive train including a clutch having an input side and an output side; and
at least one vibration damper and/or vibration absorber coupled to the output side of the clutch, the at least one vibration damper and/or vibration absorber including a first inner ring with a connecting device, as well as a flywheel mass arranged annularly coaxially to the first ring, the said flywheel mass being coupled to the first ring via an elastic element, wherein the said vibration damper and/or vibration absorber eliminates or reduces rotary vibrations generated by the combustion engine.

11. The road construction machine in accordance with claim 10, wherein the elastic element has a rigidity of 1000 Nm/rad to 500000 Nm/rad.

12. The road construction machine in accordance with claim 10, wherein the elastic element has a rigidity of 35000 Nm/rad to 45000 Nm/rad.

13. The road construction machine in accordance with claim 10, wherein the elastic element has a relative damping value of 0.05 to 0.5.

14. The road construction machine in accordance with claim 10, wherein the elastic element has a relative damping value of 0.15 to 0.2.

15. The road construction machine in accordance with claim 10, wherein the flywheel mass comprises a second ring concentric to the first ring, and the elastic element comprises at least one elastic element between the first ring and the second ring.

* * * * *

UNITED STATES PATENT AND TRADEMARK OFFICE
CERTIFICATE OF CORRECTION

PATENT NO. : 8,376,653 B2  Page 1 of 1
APPLICATION NO. : 12/596051
DATED : February 19, 2013
INVENTOR(S) : Mahlberg et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 519 days.

Signed and Sealed this
First Day of September, 2015

Michelle K. Lee
*Director of the United States Patent and Trademark Office*